July 4, 1967

K. A. HUTCHINSON 3,329,551

WHITE SIDEWALL APPLYING MACHINE

Filed Sept. 13, 1963

INVENTOR.
KEITH A. HUTCHINSON

BY

ATTORNEY

July 4, 1967  K. A. HUTCHINSON  3,329,551

WHITE SIDEWALL APPLYING MACHINE

Filed Sept. 13, 1963  4 Sheets-Sheet 3

INVENTOR.
KEITH A. HUTCHINSON
BY
J. William Freeman
ATTORNEY

July 4, 1967  K. A. HUTCHINSON  3,329,551
WHITE SIDEWALL APPLYING MACHINE
Filed Sept. 13, 1963  4 Sheets-Sheet 4

INVENTOR.
KEITH A. HUTCHINSON
BY
ATTORNEY

United States Patent Office 3,329,551
Patented July 4, 1967

3,329,551
WHITE SIDEWALL APPLYING MACHINE
Keith A. Hutchinson, Akron, Ohio, assignor to
Tire Improvement Company, Inc.
Filed Sept. 13, 1963, Ser. No. 308,813
17 Claims. (Cl. 156—394)

This invention relates to the art of pneumatic tires and in particular relates to an improvement for applying white sidewall strips to previously cured pneumatic tires for the purpose of improving the exterior appearance thereof.

In the art of pneumatic tires, it has long been known that the aesthetic appearance thereof can be enhanced by providing a circular decorative strip of preferably white material to the exterior sidewall of the tire. In the manufacture of new tires, uncured white rubber stock is placed in the mold so that the sidewall is provided on the tire at the time of original cure.

In recent years, attempts to improve the aesthetic appearance of worn tires have been directed towards the development of rings that are glued or otherwise secured in place on the exterior side wall of the tire so as to improve the appearance of the same.

In the main, the majority of subject units have been unsatisfactory due to the lack of proper bond between the tire and unit with the result that the tires frequently become separated from the unit to thus destroy the value of the same. It has been discovered that under proper conditions, uncured or cured stock portions of circular configuration can be cured to the side wall of an existing tire by applying the same under appropriate conditions of heat and temperature.

It accordingly becomes a principal object of this invention to produce a machine that can quickly and uniformly cure a white sidewall ring to an existing tire in a minimal amount of time.

Other objects of the invention will become more apparent upon a reading of the following brief specification, considered and interpreted in the light of the accompanying drawings.

Figure 1:
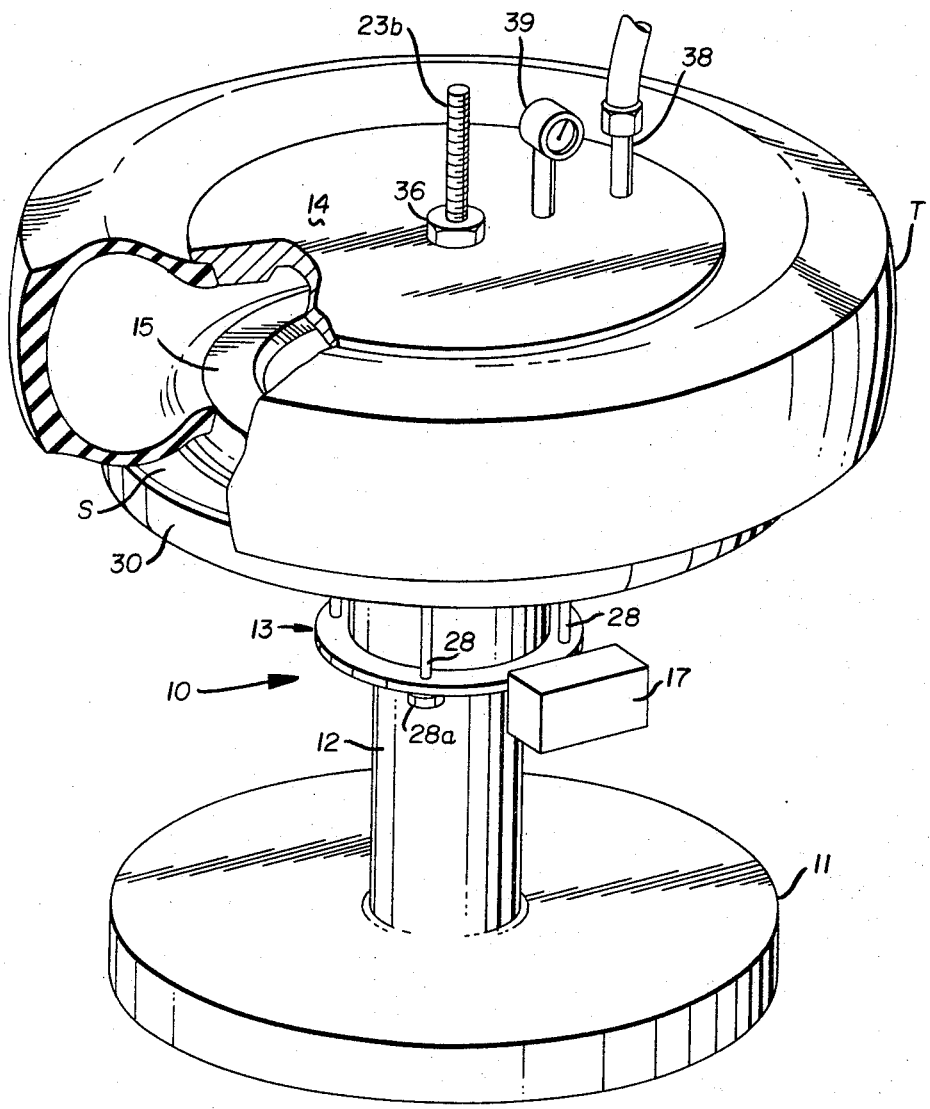
FIGURE 1 is a perspective view of the improved white sidewall applying machine, showing a tire positioned thereon and being partly broken away in section to reveal the location of the white sidewall ring that will be applied thereto.

Referring now to the drawings and in particular to FIGURE 1 through FIGURE 4 thereof, the improved white sidewall machine, generally designated by the numeral 10, includes a base stand 11 from which projects a support standard 12, with the support standard 12 in turn supporting a housing 13 that is fixed with respect to relatively movable upper and lower sealing plates 14 and 15, with actuation of the just described component parts being accomplished through the usual control panel 17 shown schematically in FIGURE 1 of the drawings.

Figure 2:
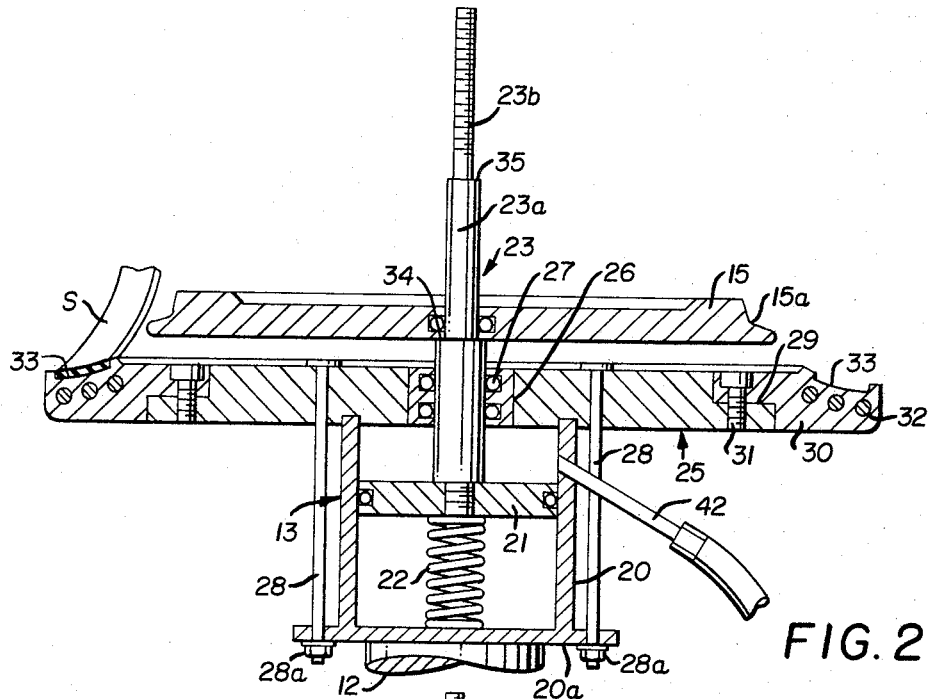
FIGURE 2 is an elevational view through the improved white sidewall machine showing the unit in loading position and further showing a strip of stock material being positioned thereon.
Figure 3:
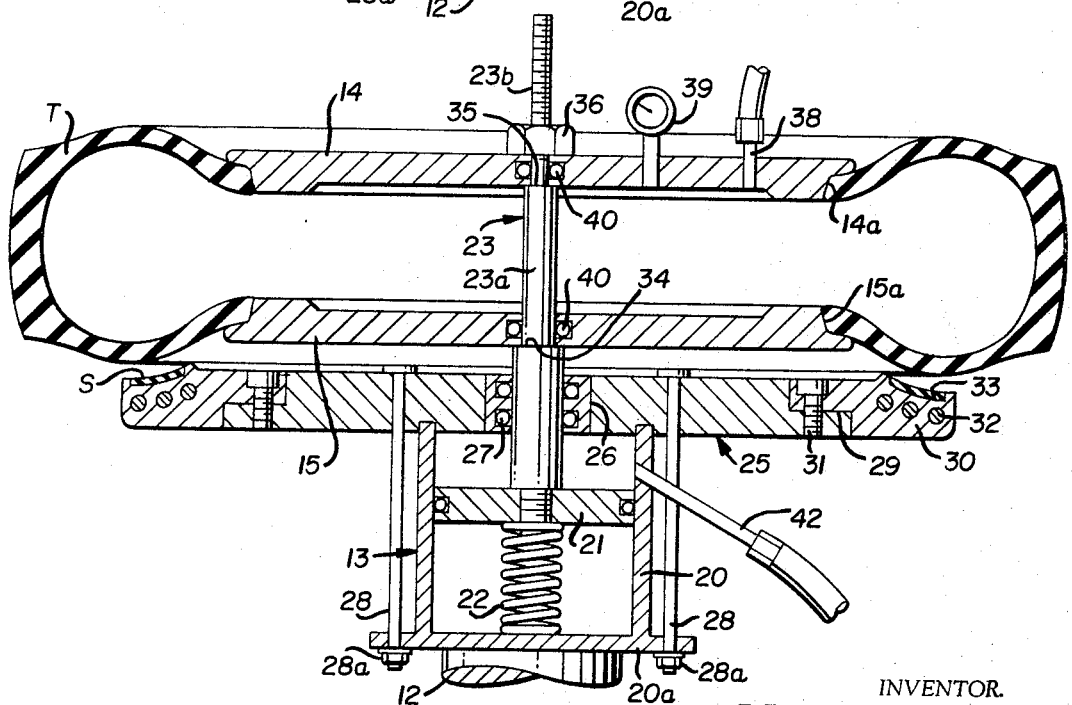
FIGURE 3 is a similar sectional view showing the unit with a tire thereon and inflated just prior to being in position with the white sidewall ring.
Figure 4:
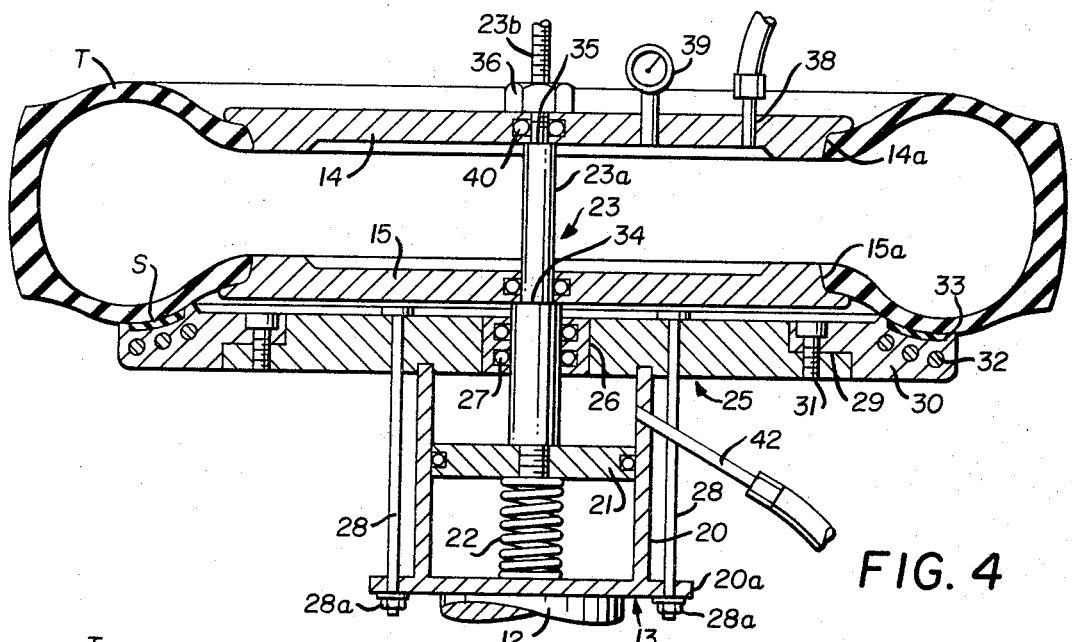
FIGURE 4 is a sectional view similar to FIGURE 2 but showing the curing cycle.

Referring now to FIGURES 2 through 4, the housing 13 is shown as including a cylindrical chamber 20 within which reciprocates a piston head 21, with spring 22 normally urging the piston head 21 and the piston rod 23 associated therewith away from the lower end 20a of the cylinder 20.

The white sidewall ring unit, generally designated by the numeral 25 is of circular configuration in plan and includes a central bore 26 within which appropriate bearings and seals 27 may be received to permit reciprocatory movement of rod 23 with respect to unit 25, with unit 25 being fixed with respect to cylinder 20 by tie rods 28, 28 that are provided with the usual nuts 28a, 28a.

As will be noted from FIGURES 2 through 4, the outer prevalent edge of the unit 25 is under-cut as at 29 to provide a seal for an outer ring unit 30, with bolts 31, 31 serving to connect the just described components together, as is clearly shown in the drawings. For the purpose of providing heat as required the ring 30 is provided with the continuous electric heating element 32 with the upper and outer end of the ring 30 further including a contoured slot 33 within which the sidewall stock material S may be received as is clearly shown in FIGURE 2 of the drawings.

Referring back now to the piston rod 23, it will be noted that the same has reduced diameter proportions 23a and 23b that respectively define shoulders 34 and 35, with the lower plate 15 being seated against shoulder 34 while the upper plate 14 seats against the shoulder 35 as clearly shown in FIGURES 2 through 4. In this regard the usual nut 36 is shown threaded onto the threaded portion 23b of rod 23 so as to preclude separation of the upper and lower plates 14 and 15 when the component parts are under pressure as will be described.

Because the upper and lower plates 14 and 15 are intended to cooperate with the tire T to seal off the bead portions thereof and permit inflation of the same it will be noted that these plates 14 and 15 have respective bead seats designated by the numerals 14a and 15a, with the upper and lower bead portions of the tire T respectively being seated on the bead seats just described as clearly shown in FIGURES 3 and 4 of the drawings.

For the purpose of providing an inflating medium, the upper plate 14 shown apertured to receive a pressure connecting element 38 with a pressure gauge 39 also being provided to indicate the internal pressure of the cavity defined by the plates 14 and 15 and the tire T as shown in FIGURE 3. Conventional sealing elements 40, 40 are provided in the just described plates for the purpose of permitting axial movement of the same on the rod 23 while simultaneously retaining internal pressure.

To the end of lowering the just described tire and plate assembly from the position of FIGURE 3 to the position of FIGURE 4, the cylinder 20 is apertured adjacent its upper end to receive a conduit 42 through which a source of pressurized air for example, can be introduced, with the force of such pressurized air forcing the piston head 21 downwardly and resulting in the similar downward movement of the rod 23, the plates 14 and 15, and the tire T.

In use or operation, it will be first assumed that the component parts have been assembled to the position of FIGURE 2 and at this time a strip of white sidewall stock material S may be manually placed in the cavity 33 so as to concentrically encircle the piston rod 23. At this time the tire may have its central opening placed over the rod 23 so as to cause the bead portion thereof to become seated on the bead portion 15a of the plate 15. Following this the plate 14 may then be placed over the reduced diameter portion 23b and move downwardly until the same seats against shoulder 35 at which time nut 36 may be threaded onto the projecting end of rod portion 23b and tightened to the position shown in FIGURE 3.

Following the positioning of the parts as shown in FIGURE 3 the chamber that is defined by the tire being seated on the upper and lower plates may be inflated or pressurized by introducing pressurized fluid through the connector 38, with inflation continuing until the proper pressure reading is indicated on dial 39. During this period of time just described, the previously positioned strip S will have been receiving heat from the element 32 so that the same will be in a preferably somewhat tacky state at this time.

Following inflation and positioning of the component parts as shown in FIGURE 3, pressurized fluid may be introduced into line 42 to thus result in the piston head 21 being forced downwardly to the position shown in FIGURE 4, with the force of the spring 22 being overcome during such movement.

During the downward movement just described it will be noted that the plate 14 will also move downwardly by virtue of being seated against the shoulder 35. Also the internal pressure that acts to urge the plate 15 against shoulder 34 will be sufficient to preclude dislodging of the plate 15 from this seated position during the just described downward movement with the result that the mounted tire, plates, and piston rod all will move downwardly in unison with the piston head 21. Accordingly, and as shown in FIGURE 4, the side wall region of the tire is now urged into pressurized registry with the seated strip S, and following curing for an appropriate time in the neighborhood of 4 to 6 minutes, at a temperature of between 250° and 400°, the pressure on line 42 may be relieved whereupon the spring 22 will urge the piston head 21 upwardly to thus return the component parts to the position of FIGURE 3 with the strip being removed from the slot 33 by virtue of its cured association with the tire T.

Following unseating, the pressure between the plates 14 and 15 may be exhausted whereupon the nut 36 can be unthreaded followed by removal of the plate 14 and the tire T.

At this time the component parts will be positioned as in FIGURE 2 and at this time the above described events can be repeated with respect to another tire.

Figure 5:
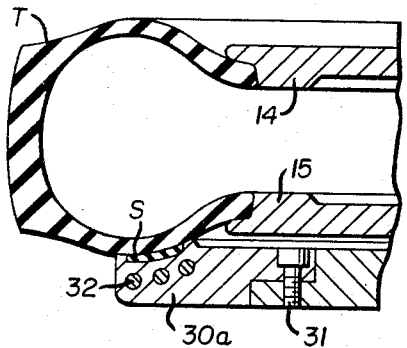
FIGURE 5 is a similar sectional view but showing a different diameter support ring being used.

The modified form of the invention shown in FIGURE 5 differs only in that the outer ring 30a is of a larger diameter than the previously described ring 30 of FIGURES 1 through 4, with this modification of the invention showing the interchangeability feature that permits use of the device with a wide range of tire sizes. Accordingly, in FIGURE 5 similar numerals are employed except as above noted.

Figure 6:
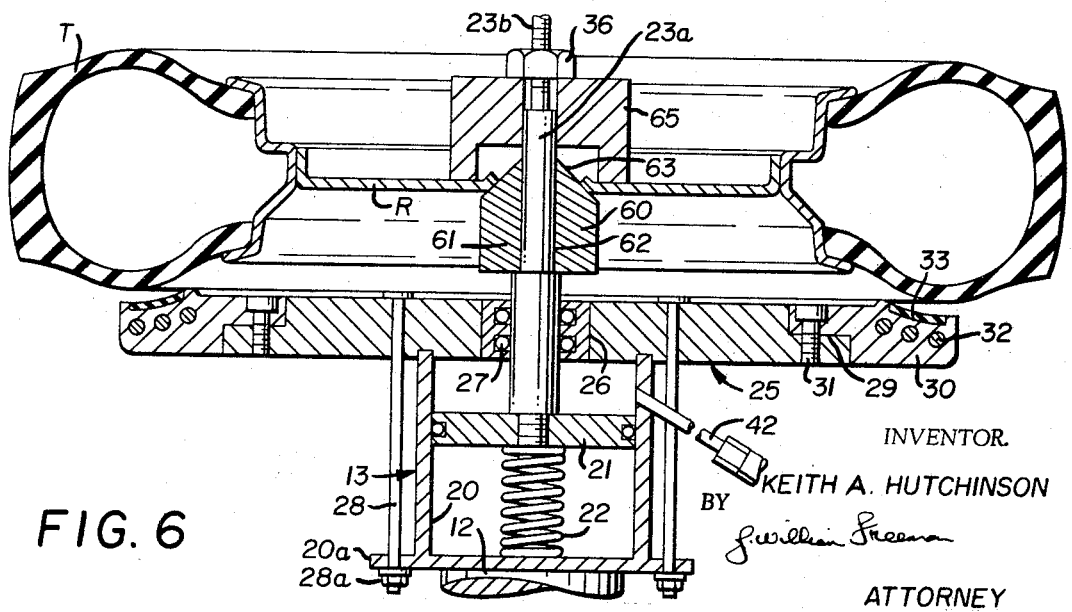
FIGURES 6 and 7 are similar sectional views showing adaptation of the invention to use with mounted tires.
Figure 7:
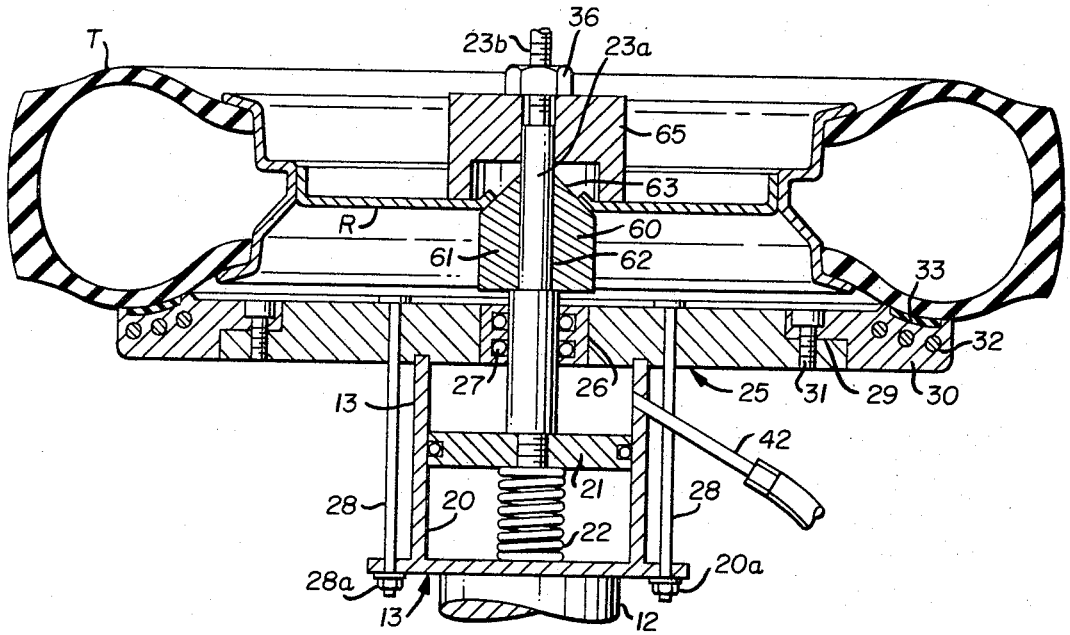

FIGURES 6 and 7 show how the device of FIGURES 1 through 4 can be adapted for use with a mounted tire by the use of a simple slide block that is designed by the numeral 60 in FIGURES 6 and 7 of the drawings, with all other component parts as previously described and accordingly being similarly numbered.

With reference to the block 60 it will be noted that it has a cylindrical base portion 61 that is suitably apertured, as at 62 to permit reception around the reduced shaft portion 23a. Additionally, an upper conical portion 63 is provided for the purpose of seating and entering the opening of the central rim portion R of the tire T thereon as clearly shown in FIGURES 6 and 7. A locking block 65 is also received over the shaft portion 23b, with block 65 being retained in clamping relationship to the rim by nut 36 as shown in FIGURE 6.

Operation of this modified form of the invention is identical to that previously described above in connection with FIGURES 1 through 4 and accordingly will not be repeated.

Figure 8:
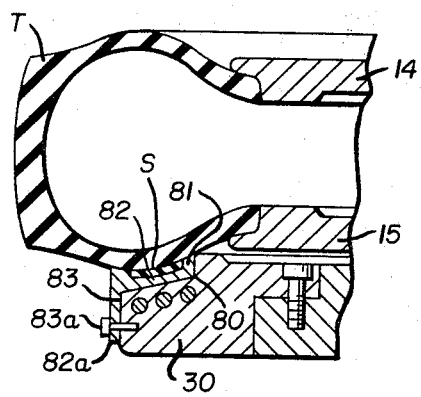
FIGURE 8 is a sectional view of a further modification of the invention.

The modified form of the invention shown in FIGURE 8 merely envisions the use of separable support ring for the curing strip S. Accordingly, in FIGURE 8 the outer rim portion 30 is undercut as at 80 to provide a seat for a circular ring element 81 that is undercut at 82 for reception at the stock S. Additionally the rim 81 has a depending peripheral flange 82a that encircles the outer periphery position at 83 and is apertured to receive locking pins 83a that serve to retain the unit in place if desired.

It will be seen with reference to this modification of the invention that a series of rings 81, 81 may be made up for use with each machine, with such rings permitting preloading of the strip S and thus minimizing the over-all time cycle of operation of the machine 10.

It will be seen from the foregoing that there has been provided a new and improved type of white sidewall applying machine that features the fixed support of a white sidewall ring followed by movement of the tire T into curing position with the supported white sidewall strip, with localized heat being employed adjacent the strip to obviate the need for a curing platen.

With reference to the stock material of the white sidewall strip it is normally preferred that the same be rubber material that is partially cured, with the same being either provided in a continuous strip form having spliced portions or being preformed to endless configuration if desired. The use of other rubbery materials requiring different curing temperatures and times is also included in the scope of this invention.

While a full and complete description of the invention has been set forth in accordance with the patent statutes, it is to be understood that the invention is not intended in any way to be limited to the specific form herein set forth.

Accordingly modifications of the invention may be resorted to without departing from the spirit hereof, or the scope of the appended claims.

Of the claims:

1. A tire molding device of the character described, comprising:
  (A) a mounting rod;
  (B) a pair of concentric plates
    (1) carried axially on said rod and being shiftable relatively thereof,
    (2) having their peripheral edges contoured to define bead seats for a tire, with a tire so seated thereon coacting with said plates to form an airtight chamber;
  (C) means for supplying pressurized fluid to said chamber;
  (D) stop means axially spaced on said mounting rod and limiting axial separation of said plates whereby disengagement thereof with respect to the beads of said tire during pressurizing of said chamber is obviated;
  (E) a mold having a cavity for reception of a circular strip to be applied to the side wall of a tire supported on said plates;
  (F) means for shifting said rod and said axially separated plates together with the tire seated thereon as a unit into and out of contact with a strip received on said cavity of said mold while said tire is inflated.

2. The device of claim 1 further characterized by the fact that said means includes pressure introduced to act upon said mounting rod.

3. A tire molding device of the character described, comprising:
  (A) a mounting rod;
  (B) a pair of concentric plates
    (1) carried axially on said rod and being shiftable relatively thereof,
    (2) having their peripheral edges contoured to define bead seats for a tire, with a tire so seated thereon coacting with said plates to form an airtight chamber;
  (C) means for supplying pressurized fluid to said chamber;

(D) stop means axially spaced on said mounting rod and limiting axial separation of said plates whereby disengagement thereof with respect to the beads of said tire during pressurizing of said chamber is obviated;
(E) said mounting rod terminating in a piston head reciprocable within a cylindrical chamber;
(F) a mold having a cavity for reception of a circular strip to be applied to the sidewall of a tire supported on said plates;
(G) means for shifting said rod and said axially separated plates together with the tire seated thereon as a unit into and out of contact with a strip received on said cavity of said mold while said tire is inflated;
(H) said means including pressure introduced to act upon said mounting rod.

4. The device of claim 3 further characterized by the fact that said mold includes a heating element.

5. A tire molding device of the character described, comprising:
(A) a mounting rod;
(B) a pair of concentric plates
    (1) carried axially on said rod and being shiftable relatively thereof,
    (2) having their peripheral edges contoured to define bead seats for a tire, with a tire so seated thereon coacting with said plates to form an airtight chamber;
(C) means for supplying pressurized fluid to said chamber;
(D) stop means axially spaced on said mounting rod and limiting axial separation of said plates whereby disengagement thereof with respect to the beads of said tire during pressurizing of said chamber is obviated;
(E) a mold having a cavity for reception of a circular strip to be applied to the sidewall of a tire supported on said plates;
(F) said mounting rod terminating in a piston head reciprocable within a cylindrical chamber;
(G) spring means opposing the movement of said piston head within said chamber;
(H) pressure introduced into said chamber forcing said piston head to move axially against the resistance of said spring means;
(I) said movement of said piston head moving said plates and said tire seated thereon as a unit into contact with a strip received in said cavity in said mold.

6. A tire molding device of the character described, comprising:
(A) a mounting rod;
(B) stop means axially spaced on said mounting rod;
(C) an inflated, rim mounted tire supported by said mounting rod;
(D) a mold having a cavity for reception of a circular strip to be applied to the sidewall of said rim mounted tire;
(E) means for shifting said mounting rod and said inflated rim mounted tire as a unit into adjacency with said mold whereby said circular strip may be applied to said sidewall.

7. The device of claim 6 further characterized by the fact that
(A) said mounting rod terminates in a piston head reciprocatable within a cylindrical chamber;
(B) spring means opposing the movement of said piston head within said chamber;
(C) said shifting means including pressure introduced to act upon said mounting rod;
(D) pressure introduced into said chamber forcing said piston head to move axially against the resistance of said spring means;
(E) said movement bringing said tire into adjacency with said circular strip.

8. A tire molding device of the character described, comprising:
(A) a mounting rod;
(B) stop means axially spaced on said mounting rod;
(C) a rim mounted tire placed on said mounting rod;
(D) a slide block received around a reduced shaft portion of said mounting rod;
(E) said slide block having a conical portion entering into and providing a seat for the central rim portion;
(F) a locking block retaining said central rim portion in seated relationship on said slide block;
(G) said mounting rod terminating in a piston head reciprocating within a cylindrical chamber;
(H) spring means opposing the movement of said piston head within said chamber;
(I) said means including pressure introduced to act upon said mounting rod;
(J) pressure introduced into said chamber forcing said piston head to move axially against the resistance of said spring means;
(K) said movement of said piston head moving said plates and said tire seated thereon as a unit into contact with a strip received in said cavity in said mold.

9. A tire molding device of the character described, comprising:
(A) a mounting rod;
(B) a pair of concentric plates
    (1) carried axially on said rod and being shiftable relatively thereof,
    (2) having their peripheral edges contoured to define bead seats for a tire, with a tire so seated thereon coacting with said plates to form an airtight chamber;
(C) means for supplying pressurized fluid to said chamber;
(D) stop means axially spaced on said mounting rod and limiting axial separation of said plates whereby disengagement thereof with respect to the beads of said tire is obviated;
(E) a mold having an undercut portion for the reception of circular ring;
(F) said ring provided with a cavity receiving a circular strip to be applied to the sidewall of a tire;
(G) means for shifting said rod and said axially separated plates together with the tire seated thereon as a unit into and out of contact with a strip received on said cavity of said mold while said tire is inflated.

10. A machne for applying decorative sidewall strips of the character described; comprising,
(A) an elongate support stand;
(B) tire supporting means adapted to support a pneumatic tire in inflated condition on said support stand;
(C) a decorative sidewall ring unit supported on said stand in concentricity with said tire supporting means and including a circular support surface upon which one face of a strip of decorative sidewall strip material may be received, with said support surface being located so that the remaining exposed surface of said strip material is in close proximity with one sidewall of a pneumatic tire supported on said tire supporting means;
(D) and means for moving said tire supporting means and the sidewall of an inflated tire carried thereon into contact with the exposed face of a supported decorative sidewall strip under the influence of pressure whereby said strip is bonded to said sidewall.

11. The device of claim 10 further characterized by the presence of heating means for elevating the temperature of strip materials supported on said support surface.

12. The device of claim 10 further characterized by the fact that said support surface includes a circular slot having bottom wall and opposed sidewalls for supporting one face of the opposed edges of said strip; the depth of said slot being at least equal to the thickness of said strip whereby the remaining face of said strip will be exposed with respect to said slot.

13. The device of claim 12 further characterized by the fact that the plane of said bottom wall is disposed in an arcuate angle with respect to the axis of said stand.

14. A machine for applying decorative sidewall strips of the character described; comprising,
  (A) an elongate support stand;
  (B) tire supporting means adapted to support a pneumatic tire in inflated condition on said support stand;
  (C) a decorative sidewall ring unit supported on said stand in concentricity with said tire supporting means and including a circular support surface upon which one face of a strip of decorative sidewall strip material may be received, with said support surface being located so that the remaining exposed surface of said strip material is in close proximity with one sidewall of a pneumatic tire supported on said tire supporting means;
  (D) and means for moving said tire supporting means and the sidewall of an inflated tire carried thereon into contact with the exposed face of a supported decorative sidewall strip under the influence of pressure whereby said strip is bonded to said sidewall;
  (E) and means for preventing shifting between said supported tire and said supported strip during the period that the same are in contact with each other under the influence of pressure.

15. A method of bonding a rubbery decorative sidewall strip to one sidewall of a pre-manufactured pneumatic tire in circular, concentrically aligned relationship therewith, comprising the steps of
  (A) supporting said strip in circular condition against axial direct movement in one direction while having the unsupported planar face thereof exposed;
  (B) aligning said pneumatic tire in concentricity with said supported strip and inflating the same in said aligned condition;
  (C) urging the sidewall of said tire into contact with the exposed face of said supported strip under the influence of pressure whereby said strip is bonded to said sidewall.

16. The method of claim 15 further characterized by the fact that said strip is heated prior to the pressurized contact with said sidewall strip.

17. The method of claim 15 further characterized by the fact that said strip is further supported against radial shifting.

References Cited

UNITED STATES PATENTS

| | | | |
|---|---|---|---|
| 2,746,515 | 5/1956 | Usack | 156—116 |
| 2,802,512 | 8/1957 | Rouse | 156—116 |
| 2,868,270 | 1/1959 | Brown | 156—394 |
| 3,113,902 | 12/1963 | Dismuke | 156—116 X |
| 3,194,712 | 7/1965 | Pollock | 156—394 |
| 3,232,816 | 2/1966 | Fields | 156—116 |

FOREIGN PATENTS 207,862   8/1956   Australia.

EARL M. BERGERT, *Primary Examiner.*

CLIFTON B. COSBY, *Examiner.*